United States Patent [19]

Bolin

[11] 4,085,807
[45] Apr. 25, 1978

[54] GAS-INSULATED TRANSMISSION LINE WITH CLOSED PARTICLE TRAP

[75] Inventor: Philip C. Bolin, Westborough, Mass.

[73] Assignee: Westinghouse Electric Corporation, Pittsburgh, Pa.

[21] Appl. No.: 797,097

[22] Filed: May 16, 1977

[51] Int. Cl.² ............................................. H01B 9/04
[52] U.S. Cl. .................................. 174/14 R; 174/16 B; 174/28
[58] Field of Search .................... 174/14 R, 16 B, 28, 174/29, 99 B

[56] References Cited

U.S. PATENT DOCUMENTS

| 3,515,939 | 6/1970 | Trump | 174/14 R X |
| 3,767,837 | 10/1973 | Graybill | 174/16 B X |
| 3,786,174 | 1/1974 | Floessel | 174/16 B X |
| 3,813,475 | 5/1974 | Cronin | 174/16 B |
| 3,814,879 | 6/1974 | Cookson et al. | 174/14 R X |
| 4,034,147 | 7/1977 | Clark et al. | 174/14 R |

Primary Examiner—Arthur T. Grimley
Attorney, Agent, or Firm—M. S. Yatsko

[57] ABSTRACT

A gas-insulated transmission line including an outer sheath, an inner conductor within the outer sheath, an insulating gas disposed within the outer sheath for electrically insulating the inner conductor from the outer sheath, and insulating supports for supporting the inner conductor within the outer sheath. A particle trap is utilized for trapping and deactivating particles within the transmission line, with the trap being spaced apart from the outer sheath at least at some portion thereof. A resilient seal is disposed at the longitudinal edges of the particle trap to prevent the particles within the trap from moving out of it.

10 Claims, 5 Drawing Figures

U.S. Patent
April 25, 1978
4,085,807
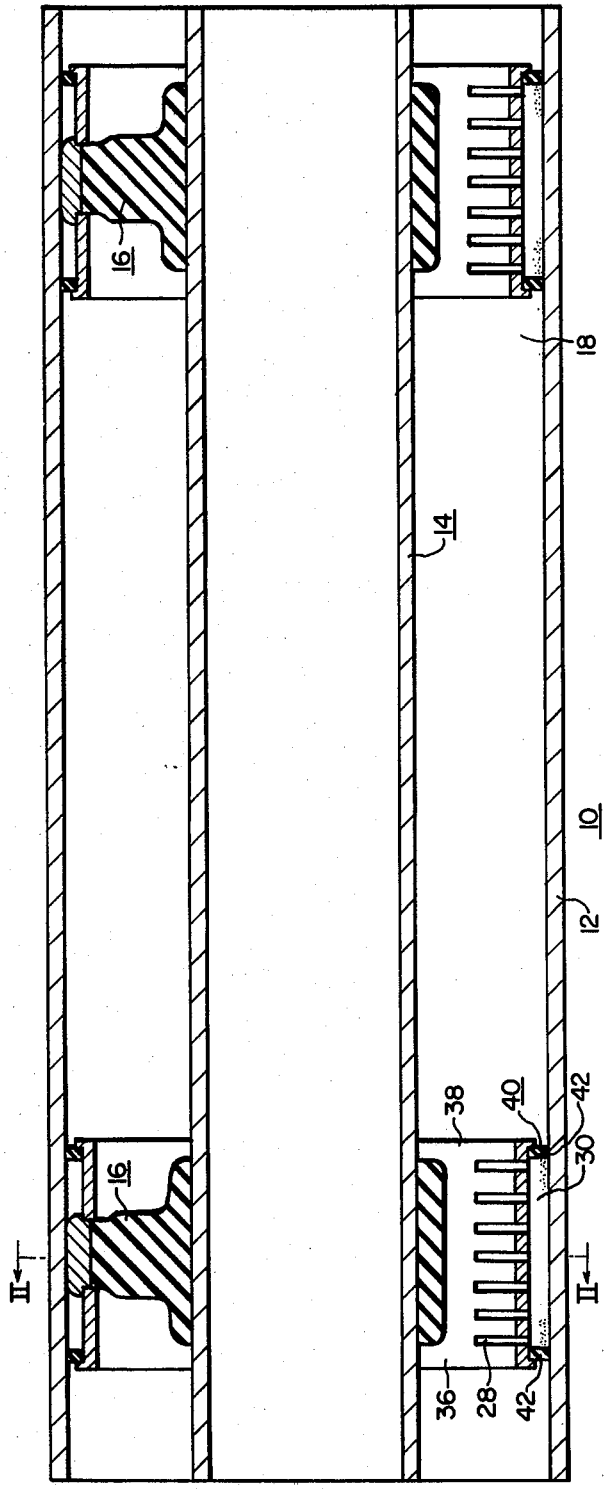
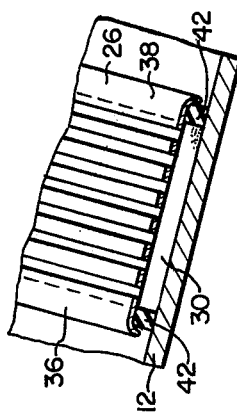
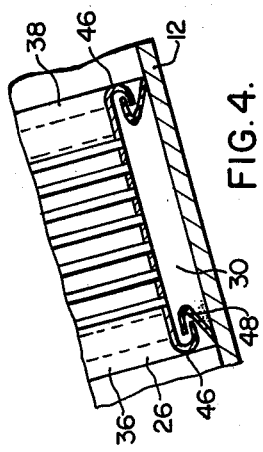
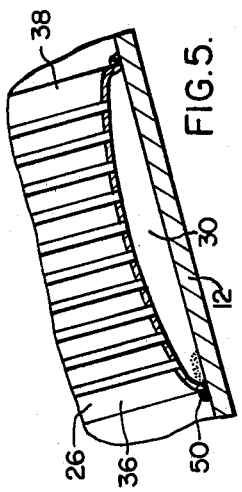
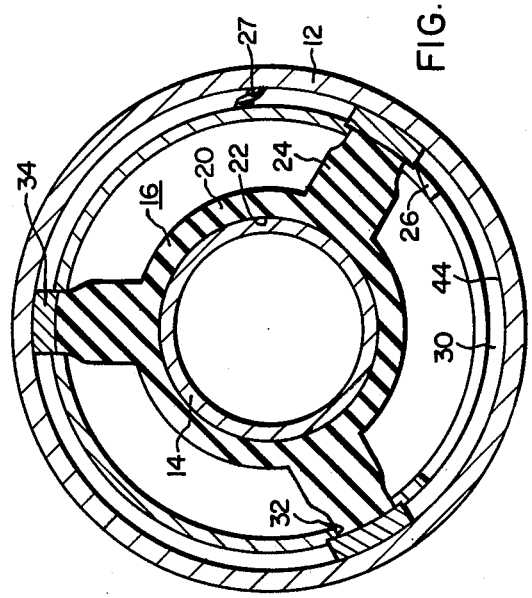

GAS-INSULATED TRANSMISSION LINE WITH CLOSED PARTICLE TRAP

BACKGROUND OF THE INVENTION

This invention relates generally to gas-insulated equipment and more particularly to a gas-insulated transmission line having a closed particle trap.

Compressed gas-insulated tramsmission lines are being used in an ever increasing scale in recent years due to the desirability of increasing safety, problem in acquiring the necessary right-of-way for overhead lines, and higher power loads required by growing metropolitan areas and growing demands for electrical energy. Gas-insulated transmission lines typically comprise a hollow sheath, a conductor disposed within the sheath, a plurality of solid insulating spacers which support the conductor, and a compressed gas such as sulfur hexafluoride in the sheath to electrically insulate the conductor from the sheath. The typical assembly has been fabricated from relatively short sections of hollow ducts in which conductors and insulators are inserted. This assembly is usually completed in the factory, and the sections are welded or otherwise secured together in the field to form the transmission line. Gas barriers may be provided at intervals along the length of the assembly and, after evacuation of the line, an insulating gas is forced into the sheath under pressure. It is also known to provide a particle trap in gas-insulated transmission lines as it is disclosed in the patent to Trump, U.S. Pat. No. 3,515,939.

Trump disclosed a means for deactivating and eliminating the deleterious effects of any conducting or semiconducting particles which may be present within the gas insulated transmission line. In the patent, Trump describes the use of electrodes placed inside the outer sheath to create low field regions which trap and deactivate the particles. Whenever a particle enters the low field region, it cannot acquire enough force to propel it out of the region and thus is trapped in the low field region so that it cannot initiate breakdown of the line. However, it has been found that under certain circumstances the field reducing means of Trump do not function as effectively as may be desired. For example, if the transmission line is not horizontal but instead is sloped, the particles which had been trapped in the low field region can be moved by mechanical vibration or gas flow out of the low field region. Whenever these particles are outside the low field region, they can travel between the inner and outer conductors and so initiate breakdown.

SUMMARY OF THE INVENTION

In accordance with this invention, it has been found that a more desirable gas-insulated transmission line is provided which comprises an elongated outer sheath, an elongated inner conductor disposed within the outer sheath, an insulating gas electrically insulating the inner conductor from the outer sheath, and support means for insulatively supporting the inner conductor within the outer sheath. An apertured trapping member is disposed within, and electrically connected to, the outer sheath, with the trapping member being spaced apart from the outer sheath at least at some portion thereof. The trapping member and the outer sheath form a low field region therebetween for the entrapment of particles therein, and the trapping member has first and second longitudinal end portions. Means are connected to at least one end of the trapping member and the outer sheath, and prohibit the movement of particles from within the low field region to longitudinally outwardly beyond the end of the trapping member.

BRIEF DESCRIPTION OF THE DRAWINGS

Reference is now made to the description of the preferred embodiment, illustrated in the accompanying drawings, in which:

FIG. 1 is a longitudinal, sectional view of a gas-insulated transmission line utilizing the teachings of this invention;

FIG. 2 is a sectional view taken along line II—II of FIG. 1;

FIG. 3 is a detailed view of the movement prohibiting means of FIG. 1;

FIG. 4 is a modification of the movement prohibiting means of FIG. 3; and

FIG. 5 is a modification of the view of FIG. 3.

DESCRIPTION OF THE PREFERRED EMBODIMENT

Referring now to FIG. 1, therein is illustrated a gas-insulated transmission line 10 utilizing the teachings of this invention. The transmission line 10 comprises a generally cylindrical, elongated outer sheath 12 at low potential, and an elongated, generally cylindrical inner conductor 14 disposed within the outer sheath 12 and at a high electrical with respect thereto. The inner conductor 14 and the outer sheath 12 are of a good electrically conducting material such as aluminum. Insulatively supporting the inner conductor 14 within the outer sheath 12 are a plurality of insulating spacers 16. Disposed within the outer sheath 12, and electrically insulating the inner conductor 14 from the outer sheath 12 is an insulating gas 18 typical of which is sulfur hexafluoride at pressures such as 45 pounds per square inch.

As illustrated in FIG. 2, the support insulator 16 includes a centrally disposed body member 20 having a central bore 22 therethrough, and a plurality of legs 24 which extend radially outwardly from the body member 20 to the outer sheath 12. Also shown is a particle trapping member 26 which is in the form of a ring which is spaced apart from the outer sheath 12 and is electrically connected thereto by the contact 27. The ring 26 has a plurality of apertures 28 (see FIG. 1) therein which open into the low field region 30 between the ring 26 and the outer sheath 12. The ring 26 has a plurality of leg holes 32 therein through which the legs 24 extend to the outer sheath 12. The ring 26 is secured to the legs 24 where the legs 24 extend through the leg holes 32. As shown, the legs 24 extend partially through the leg holes 32, and a mounting element 34 extends from the outer sheath 12 through the leg hole 32 to where it is secured to the leg 24. In this manner, the ring 26 is maintained in its spaced apart relationship with the outer sheath 12. The inner conductor 14 extends through the central bore 22 of the body member 20.

Any particles which are present within the transmission line 10 will become trapped and deactivated in the low field region 30 between the ring 26 and the outer sheath 12, and the most probable way in which these particles will enter the low field region 30 is through the apertures 28 in the ring 26. However, once they are in this low field region 30, the particles may move longitudinally outwardly beyond either end 36, 38 of the ring 26 because of gas flow, mechanical rapping of the outer sheath 12, or due to gravity if the transmission line 10 is disposed at an angle. Therefore, to prevent these particles from moving longitudinally outwardly beyond the ring 26, means 40 are connected to the end portion 36, 38 of the ring 26 and to the outer sheath 12. The movement preventing means 40 illustrated in FIGS. 1 and 3, are comprised of a generally annular, resilient seal 42 made of polypropylene felt, polypropylene foam, or possibly foamed TEFLON. By being so disposed adjacent the ends 36, 38 of the ring 26, and particles which are present within the low field region 30 are prevented from moving longitudinally outwardly beyond the edges 36, 38 by the resilient seal 42. Although for ease of installation the resilient seal 42 has been described as extending about the outer circumference of the ring 26, the seal 42 need only extend along the bottom 44 of the outer sheath 12 where the particles, due to the forces of gravity, will remain. This is shown in FIG. 2 as extending between the lower two legs 24.

If the transmission line 10 is installed at locations where it must be inclined to the horizontal, as illustrated in FIG. 3, the particles which may be present within the low field region 30 will generally end up disposed adjacent to the seal 42 which is at the vertically lowermost end 38 of the ring 26. In these locations, with the transmission line 10 disposed at an angle, the necessity for providing a seal 42 at both ends 36, 38 of the ring 26 is not mandatory, and the seal 42 at the uppermost end 36 of the ring 26 may be dispensed with if desired.

A modification of the movement preventing means 40 is illustrated in FIG. 4. In this modification, the end portion 36, 38 of the ring 26 has a hook member 46 which extends inwardly towards the low field region 30. An annular wiper 48, of a resilient material, is held by the hook member 46 and extends radially outwardly and contacts the outer sheath 12. By being so positioned, any particles which may be present within the low field region 30 are prevented from extending longitudinally outwardly beyond the end 36 of the ring 26 by the wiper 48.

The movement prohibiting means 40 shown in FIGS. 1, 3 and 4 are especially useful in gas-insulated transmission lines which compensate for thermal expansion of the inner conductor 14 with respect to the outer sheath 12. As is known, one manner of compensating for such thermal expansion is to have the support insulator 16 fixedly secured to the inner conductor 14 but slidably mounted with respect to the outer sheath 12. Therefore, upon expansion of the inner conductor 14, the support insulator 16 moves longitudinally along the outer sheath 12 with the inner conductor 14. The resilient particle movement means 40 can move with the ring 26 as the ring 26 moves with the support insulator 16 because of its being secured thereto. Thus, the particles which may be present within the low field region 30 are maintained with the low field region 30 because they cannot extend longitudinally outwardly beyond the end portions 36, 38 of the ring 26 because of the movement prohibiting means 40.

A modification of the movement prohibiting means 40 is illustrated in FIG. 5. This modification may be desirable, where, for example, the insulating support 16, and the ring 26 is fixed in its location within the outer sheath 12, and where the inner conductor 14 is permitted longitudinal movement within the bore 22 of the central body member 20. In this modification, the end portions 36, 38 of the ring 26 extend radially outwardly adjacent to the outer sheath 12. An edge seal 50 is disposed between the end portion 36, 38 and the outer sheath 12, and the edge seal 50 fills the space between the end 36 and the outer sheath 12 so that any particles which may be present within the low field region 30 cannot move longitudinally outwardly beyond the end portion 36. The edge seal 50 is perferably of a material which is initially soft and resilient, but which hardens after the passage of time. By being of such a material, the edge seal 50 can, upon installation of the ring 26 and the seal itself 50 conform to the interior of the outer sheath 12 and ring 26 without the necessity for tight tolerances or accurate alignment. This is the same reason why the seal 42 and the wipers 48 of FIGS. 3 and 4 are made of a resilient material. After the edge seal 50 then hardens, the material of the edge seal 50 will not flow downwardly along the incline of the outer sheath 12. Materials of which the edge seal 50 can be made would be epoxy or silicone rubber adhesive. Thus, it can be seen that this invention provides means for maintaining particles within low field regions between particle trapping members and the outer sheath in gas-insulated transmission lines even in the presence of vibration or gas flow or when the transmission line is disposed on an incline.

I claim as my invention:

1. A gas-insulated transmission line comprising:
   an elongated outer sheath;
   an elongated inner conductor disposed within said outer sheath;
   an insulating gas disposed within said outer sheath and electrically insulating said inner conductor from said outer sheath;
   means for insulatably supporting said inner conductor within said outer sheath;
   an apertured trapping member disposed within, and electrically connected to, said outer sheath, said trapping member being spaced-apart from said outer sheath at least at some portion thereof and forming a low field region therebetween for the entrapment of particles therein, said trapping member having first and second longitudinal end portions; and
   first means connected to said trapping member first end portion and said outer sheath for prohibiting the movement of particles from said low field region to outwardly longitudinally beyond said first end portion.

2. The transmission line according to claim 1, including second means connected to said trapping member second end portion and said outer sheath for prohibiting the movement of particles from said low field region to outwardly longitudinally beyond said second end portion.

3. The transmission line according to claim 1, wherein said first movement prohibiting means comprises a resilient seal made of polypropylene.

4. The transmission line according to claim 1, wherein said trapping member comprises an apertured ring spaced-apart from said outer sheath, and a contact member electrically connects said ring and said outer sheath.

5. The transmission line according to claim 4, wherein said first movement prohibiting means comprises a resilient seal disposed intermediate, and contacting, said first end portion and said outer sheath.

6. The transmission line according to claim 1, wherein said transmission line is inclined from the horizontal and said trapping member first end portion is vertically lower than said trapping member second end portion.

7. The transmission line according to claim 1, wherein said first end portion has a hook member extending inwardly towards said low field region, and said first movement prohibiting means comprises a resilient wiper held by said hook member and extending radially outwardly to, and contacting, said outer sheath.

8. The transmission line according to claim 1, wherein said first movement prohibiting means comprises an edge seal disposed between and contacting said first end portion and said outer sheath and being made of a material which is initially soft and which, after the passage of time, hardens.

9. The transmission line according to claim 8, wherein said edge seal material is epoxy or silicone rubber adhesive.

10. The transmission line according to claim 1, wherein said support means comprises a body member having a plurality of legs extending radially outwardly to said outer sheath, said body member having a central bore therethrough through which said inner conductor extends;

said trapping member comprises and apertured ring spaced-apart from said outer sheath and a contact member electrically connecting said ring and said outer sheath, said ring having a plurality of leg holes therein through which said support means legs extend, said ring being secured to said legs whereby said legs position said ring spaced-apart from said outer sheath; and said first movement prohibiting means comprises a resilient seal disposed intermediate, and contacting, said first end portion and said outer sheath.

* * * * *